3,260,682
CATALYST COMPOSITIONS CONSISTING OF COBALT MOLYBDATE AND VARIOUS MOLYBDATE HARDENERS
George Calvin, Newcastle-upon-Tyne, Barrie Wood, Epsom, and Rowland Harris Jenkins, West Ewell, England, assignors to The Distillers Company Limited, Edinburgh, Scotland, a British company
No Drawing. Filed July 30, 1964, Ser. No. 386,442
Claims priority, application Great Britain, Jan. 25, 1961, 2,883/61
8 Claims. (Cl. 252—464)

The present invention relates to new oxidation catalysts and is a continuation-in-part of our application Serial No. 166,673, filed January 16, 1962, now abandoned.

In our copending application Serial No. 4,221, filed January 25, 1960, is described and claimed the process for the production of acrylic or methacrylic acid by reacting at an elevated temperature in the vapor phase acrolein or methacrolein with molecular oxygen over an oxidation catalyst comprising cobalt molybdate. This catalyst gives high yields of acrylic acid from acrolein.

It is known that, after heating to a high temperature, cobalt molybdate may on cooling undergo a spontaneous phase change, during which particulate material is disrupted to a fine powder. This phenomenon, known as "spalling," has been reported in the literature.

We find that our cobalt molybdate catalyst, as claimed in our copending application, Serial No. 4,221 may occasionally show some tendency towards spalling if it has been heated to a temperature somewhat above the optimum, for example within the range 650° to 700° C. The onset of spalling is variable, and may occur rapidly on cooling to room temperature, or alternatively may only occur very slowly, during several months of storage. The tendency to spall is increased by rough handling, in which the pellets are subjected to abrasive or attrition forces, or to mechanical shock.

It is the aim of the present invention to provide a catalyst of improved physical properties, which suffers neither from spontaneous disintegration or crumbling after heat treatment, nor from poor resistance to attrition during handling and storage.

Accordingly the present invention is an oxidation catalyst suitable for catalysing the vapor phase oxidation of unsaturated aldehydes selected from the group consisting of acrolein and methacrolein to produce the corresponding unsaturated acids which consists essentially of cobalt molybdate having therein a minor proportion of metallic molybdate hardener selected from the group consisting of manganese, cadmium, tin, antimony, chromium, uranium, aluminum, thorium, zirconium, and mixtures therein, of heat treated to a hardness, on standard attrition test, of not more than 5% breakdown.

The catalysts were also tested for resistance to heat by heating to a high temperature for a period of 16 hours and examining the pellets for signs of collapse.

A preferred catalyst contains manganese and/or cadmium molybdate as hardener.

The hardener may be present in a moderately wide range of proportions, for instance between 0.01 and 20 moles percent and preferably between 0.1 and 10 moles percent. The hardener may be incorporated in the cobalt molybdate in any suitable manner for instance by co-precipitation.

The cobalt molybdate catalyst may be prepared by mixing an aqueous solution of a cobalt salt, an aqueous solution of a salt of the metal to be incorporated as hardener, and an aqueous solution or suspension of molybdic acid or a molybdic acid salt, adding a nitrogenous base such as ammonia or an aliphatic amine for example ethanolamine, ethylamine, triethylamine or ethylene diamine or a cycloaliphatic amine for example piperidine, or teterocyclic amines for example pyridine or a nitrogenous base compound for example hydrazine or aniline to the aqueous mixture, filtering off and subjecting the resulting precipitate to a heat treatment. The heat treatment may be merely drying off the precipitate at for example 100° C. or preferably a drying followed by a two-stage heat treament. After being dried the compound is subjected to a first heat treatment in air at about 350–650° C., after which the material is ground and formed into pellets.

The catalyst is then subjected to a final heat-treatment at about 500° to 650° C., preferably at about 600° C. Hard blue pellets are obtained. It is found that by use of this preferred two-stage heat treatment a harder catalyst is obtained and that the catalyst pellets have less tendency to break up through attrition.

The precipitated catalyst composition designated Blue I which is blue in color after being dried is subjected to the first heat treatment in which it undergoes a phase change to a material designated Blue II also blue in color, but which gives a different X-ray diffraction pattern. On grinding or pelleting of this material there is a further phase change in color to a green or black substance depending on the state of sub-division of the particles. Heating this ground material reconverts it to the material Blue II produced after the first heat treatment. This second heat treated material however possesses substantially increased resistance to wear, i.e. when the Blue II phase is approached from the green phase the pellets are harder than if the approach is from Blue I to Blue II.

The ratio of cobalt to molybdenum in the catalyst may vary within moderately wide limits, but it is preferred to use a molar ratio not substantially greater than 1:1.

The cobalt molybdate catalyst may be used as such or on a support as alumina.

Two physical tests are used to compare the hardness and stability of catalyst pellets: an *attrition test* (on pellets which have been given the standard heat-treatment) gives a measure of hardness and resistance to spalling under conditions of mechanical stress, and a *heat treatment test* (at temperatures above the standard heat-treatment temperature) shows the thermal tolerance of the pellets.

1. ATTRITION TEST 10 g. of 3 mm. diameter pellets are weighed into a glass bottle approximately 1½ inches long by 1¼ internal diameter, containing a stainless steel roller 1 inch long by ⅝ diameter, and the bottle is mechanically rotated on horizontal rollers at 140 r.p.m. for 10 minutes. The contents are then removed, shaken in a 10 mesh BSS sieve and the weight of material passing through the sieve is determined. This weight is expressed as a percentage of the original weight of the pellets.

2. HEAT-TREATMENT TEST

Samples of the pellets are heated for 16 hours at a series of temperatures above the optimum, usually 650° C., 700° C. and 800° C., then cooled and allowed to stand at ambient temperature for 24 hours. The pellets are then examined visually for signs of powder-formation.

The following examples, in which all parts are by weight, are given further to illustrate the catalyst of the present invention.

*Example 1*

A solution of cobalt nitrate (291 parts) and manganous sulphate (22.3 parts) in water (220 parts) was heated to 60° C. and to this solution was added ammonium molybdate (194.5 parts) in water (520 parts).

The mixture was well stirred and aqueous ammonia (5.4 N; 240 parts) added during 30 minutes, the temperature being maintained at 55–60° C. Stirring was continued for 15 minutes after the addition of ammonia and the precipitate was then filtered and washed twice by re-suspension in distilled water (500 parts) and dried in an oven at 110° C.

The resulting powder was heated at 400° C. for 16 hours, then pelleted with the addition of 2% graphite as lubricant, and finally heated at 600° C. for 16 hours. The catalyst contained 10 mole percent of manganous molybdate.

A gaseous mixture of 10% by volume of acrolein, 10% by volume of oxygen, 50% by volume of nitrogen, and 30% by volume of steam was passed over the catalyst maintained in a reactor at 360° C., the contact time being 3.6 seconds.

Of the acrolein fed to the reactor 60% was converted to acrylic acid. The yield of acrylic acid based on acrolein consumed was 73%.

The catalyst pellets were very hard. The standardised attrition test gave only 2% breakdown. The stability of this catalyst to thermal treatment was demonstrated by submitting it to a heat treatment at 825° C. for 16 hours. No pellet collapse was observed.

In comparison a cobalt molybdate catalyst similarly prepared in the absence of the manganese additive gave a 15 to 20% breakdown in the standard attrition test and collapsed after a heat treatment at only 650° C.

*Example 2*

A cobalt molybdate catalyst was prepared as described in Example 1 except that cadmium nitrate (30.8 parts) was substituted for the manganous sulphate. The resulting catalyst contained 10 mole percent of cadmium molybdate.

A gaseous mixture of 10% by volume of acrolein, 10% by volume of oxygen, 50% by volume of nitrogen, and 30% by volume of steam was passed over the catalyst maintained in a reactor at 400° C., the contact time being 3.6 seconds.

Of the acrolein fed to the reactor 53% was converted to acrylic acid. The yield of acrylic acid based on acrolein consumed was 56%.

The catalyst pellets were hard. Only 0.2% breakdown occurred during the standard attrition test, and no pellet collapse occurred after heating at temperatures between 600° and 800° C. for 16 hours.

A second catalyst, prepared in a similar manner and containing 1 mole percent of cadmium molybdate, gave a conversion to acrylic acid of 65% of the acrolein fed, and a yield of 72% of acrylic acid based on acrolein consumed. This catalyst was physically more robust and showed greater stability to heating as compared with an additive free cobalt molybdate catalyst.

*Example 3*

A cobalt molybdate catalyst was prepared as described in Example 1 except that stannic chloride pentahydrate (3.5 parts) was substituted for the manganous sulphate used in Example 1, and the quantity of ammonium molybdate used was reduced to 179 parts. The resulting catalyst contained 1.0 mole percent of stannic molybdate.

A gaseous mixture of 10% by volume of acrolein, 10% by volume of oxygen, 50% by volume of nitrogen, and 30% by volume of steam was passed over the catalyst maintained in a reactor at 360° C., the contact time being 3.6 seconds.

Of the acrolein fed to the reactor 57% was converted to acrylic acid. The yield of acrylic acid based on acrolein consumed was 61%.

The catalyst showed no signs of pellet collapse after heat treatments at temperatures as high as 700° C.

*Example 4*

A cobalt molybdate catalyst was prepared as in Example 1, except that aluminum nitrate (37.5 parts) was substituted for manganous sulphate.

A gaseous mixture of 10% by volume of acrolein, 10% by volume of oxygen, 50% by volume of nitrogen, and 30% by volume of steam was passed over the catalyst maintained in a reactor at 380° C., the contact time being 3.6 seconds.

Of the acrolein fed to the reactor 54% was converted to acrylic acid. The yield of acrylic acid based on acrolein consumed was 62%.

The catalyst pellets, after heat treatment at 650° C. showed no tendency to collapse, and gave only 1.8% of powder in the standard attrition test.

*Example 5*

A cobalt molybdate catalyst was prepared as in Example 1, except that zirconium nitrate dihydrate (26.7 parts) was used in place of the manganous sulphate and the resulting catalyst, containing 10 mole percent of zirconium molybdate, was heated at 400° C. for 16 hours, pelleted, and then heated again at 650° C. for 16 hours.

A gaseous mixture of 10% by volume of acrolein, 10% by volume of oxygen, 50% by volume of nitrogen, and 30% by volume of steam was passed over the catalyst maintained in a reactor at 382° C., the contact time being 3.6 seconds.

Of the acrolein fed to the reactor 27% was converted to acrylic acid. The yield of acrylic acid based on acrolein consumed was 44%.

The catalyst pellets were physically stable and did not collapse even after heating at 750° C. for 16 hours.

*Example 6*

A cobalt molybdate catalyst was prepared as in Example 1 except that chromium nitrate nonahydrate (4.0 parts) were used in place of the manganous sulphate of Example 1 and the amount of ammonium molybdate used was 179 parts. The resulting catalyst contained 0.3 mole percent of chromium molybdate.

A gaseous mixture of 10% by volume of acrolein, 10% by volume of oxygen, 50% by volume of nitrogen, and 30% by volume of steam was passed over the catalyst maintained in a reactor at 360° C., the contact time being 3.6 seconds.

Of the acrolein fed to the reactor 58% was converted to acrylic acid. The yield of acrylic acid based on acrolein consumed was 71%.

The catalyst showed no signs of pellet collapse, even after heat treatment at temperatures to 750° C.

*Example 7*

A cobalt molybdate catalyst was prepared as described in Example 1 except that 3.1 parts of cadmium nitrate was also included with the manganous sulphate, and the quantity of ammonium molybdate used was 195.8 parts. The resulting catalyst contained 10 mole percent of manganous molybdate and 1 mole percent of cadmium molybdate.

The catalyst pellets were hard, after being subjected to the same double heat treatment procedure as described in Example 1, and suffered 1.2% breakdown during the attrition test.

A gaseous mixture of 10% by volume of acrolein, 10% by volume of oxygen, 50% by volume of nitrogen, and 30% by volume of steam was passed over the catalyst, maintained in a reactor at 380° C., the contact time being 3.6 seconds.

Of the acrolein fed to the reactor, 64% was converted to acrylic acid. The yield of acrylic acid based on acrolein consumed was 78%.

The catalyst showed no signs of pellet collapse after heat treatment at temperatures as high as 725° C. for 16 hours.

Example 8

The catalyst was prepared as described in Example 1 except that 50.2 parts uranyl nitrate was used instead of manganous sulphate, and the amount of ammonium molybdate used was 194.1 parts. The cobalt molybdate catalyst contained 10 mole percent of uranyl molybdate.

A gaseous mixture of 10% by volume of acrolein, 10% by volume of oxygen, 50% by volume of nitrogen and 30% by volume of steam was passed over the catalyst in a reactor at 358° C., the contact time being 3.6 seconds.

Of the acrolein fed to the reactor, 57.6% was converted to acrylic acid, and the yield of acrylic acid based on the acrolein consumed was 70.7%.

The catalyst pellets subjected to a double heat treatment at temperatures described in Example 1 were hard; the pellets did not collapse after a heat treatment at 650° C. for 16 hours.

Example 9

The catalyst was prepared as described in Example 1 except that 58.8 parts of thorium nitrate was used instead of manganous sulphate, the amount of ammonium molybdate used was 211.8 parts, and the catalyst pellets were subjected to a second heat treatment at 650° C. for 16 hours instead of 600° C. for 16 hours.

The cobalt molybdate catalyst contained 10 mole percent of thorium molybdate.

A gaseous mixture of 10% by volume of acrolein, 10% by volume of oxygen, 50% by volume of nitrogen and 30% by volume of steam was passed over the catalyst in a reactor at 359° C., the contact time being 3.6 seconds.

Of the acrolein fed to the reactor, 49.3% was converted to acrylic acid, and the yield of acrylic acid based on the acrolein consumed was 60.1%.

The catalyst pellets were hard and withstood heat treatments at temperatures as high as 700° C.

Example 10

The catalyst was prepared as described in Example 1, except that 17.5 parts of stannic chloride and 61.5 parts of antimony tetroxide were used instead of manganous sulphate, and the amount of ammonium molybdate used was 185.4 parts.

A gaseous mixture of 10% by volume of acrolein, 10% by volume of oxygen, 50% by volume of nitrogen, and 30% by volume of steam was passed over the catalyst in a reactor at 341° C., the contact time being 3.6 seconds.

Of the acrolein fed to the reactor 50% was converted to acrylic acid, and the yield of acrylic acid based on acrolein consumed was 67%.

The catalyst pellets were hard, and did not collapse after a heat treatment at 650° C. for 16 hours.

We claim:

1. An oxidation catalyst suitable for catalyzing the vapour phase oxidation of an unsaturated aldehyde selected from the group consisting of acrolein or methacrolein to produce the corresponding unsaturated acids which consists essentially of cobalt molybdate together with from 0.01 to 20 moles percent of one of the molybdates selected from the group consisting of manganese, cadmium, tin, antimony, chromium, uranium, aluminum, thorium and zirconium characterized by a hardness on standard attrition test of not more than 5% breakdown.

2. An oxidation catalyst as claimed in claim 1 wherein the proportion of added molybdate is between 0.1 and 10 moles percent.

3. An oxidation catalyst as claimed in claim 1 wherein the molar ratio of cobalt to molybdate is about 1:1. the molar ratio of cobalt to molybdenum is about 1:1.

4. An oxidation catalyst as claimed in claim 1 wherein the molybdate is manganese molybdate.

5. An oxidation catalyst as claimed in claim 1 wherein the molybdate is cadmium molybdate.

6. A process for the preparation of a catalyst for catalyzing the vapor phase oxidation of acrolein or methacrolein to the corresponding acids which comprises adding ammonia to an aqueous solution which contains (1) a water soluble cobalt salt, (2) a salt selected from the group consisting of water soluble salts of manganese, cadmium, tin, antimony, chromium, uranium, aluminum, thorium and zirconium, and (3) a compound selected from the group consisting of molybdic acid and water soluble salts thereof, recovering resulting precipitate and thereafter heating said precipitate at 250° C. to 600° C., pelletizing, and again heating at 500° C. to 650° C.

7. A process for the preparation of a catalyst for catalyzing the vapor phase oxidation of acrolein or methacrolein to the corresponding acids which comprises adding ammonia to an aqueous solution which contains (1) a water soluble cobalt salt, (2) a water soluble salt of manganese, and (3) a compound selected from the group consisting of molybdic acid and water soluble salts thereof, recovering resulting precipitate and thereafter heating said precipitate at 250° C. to 600° C., pelletizing, and again heating at 500° C. to 650° C.

8. A process for the preparation of a catalyst for catalyzing the vapor phase oxidation of acrolein or methacrolein to the corresponding acids which comprises adding ammonia to an aqueous solution which contains (1) a water soluble cobalt salt, (2) a water soluble salt of cadmium, and (3) a compound selected from the group consisting of molybdic acid and water soluble salts thereof, recovering resulting precipitate and thereafter heating said precipitate at 250° C. to 600° C., pelletizing, and again heating at 500° C. to 650° C.

References Cited by the Examiner

UNITED STATES PATENTS

| | | | |
|---|---|---|---|
| 2,260,409 | 10/1941 | Slotterbeck et al. | 252—465 X |
| 2,959,613 | 11/1960 | Whitfield | 260—530 X |
| 2,967,820 | 1/1961 | Johnson et al. | 252—465 X |
| 3,087,964 | 4/1963 | Koch et al. | 252—470 X |

FOREIGN PATENTS

| | | |
|---|---|---|
| 3,094,565 | 6/1963 | Great Britain. |
| 3,098,102 | 7/1963 | Great Britain. |

OSCAR R. VERTIZ, *Primary Examiner.*

MAURICE A. BRINDISI, *Examiner.*

G. L. OZAKI, *Assistant Examiner.*